(12) United States Patent
Hirai et al.

(10) Patent No.: US 11,384,953 B2
(45) Date of Patent: Jul. 12, 2022

(54) AIR CONDITIONING SYSTEM

(71) Applicant: DAIKIN INDUSTRIES, LTD., Osaka (JP)

(72) Inventors: Kousuke Hirai, Osaka (JP); Tooru Fujimoto, Osaka (JP); Akiyoshi Yamamoto, Osaka (JP); Gakuto Sakai, Osaka (JP); Yoshitaka Matsugi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/609,575

(22) PCT Filed: Apr. 24, 2020

(86) PCT No.: PCT/JP2020/017720
§ 371 (c)(1),
(2) Date: Nov. 8, 2021

(87) PCT Pub. No.: WO2020/230590
PCT Pub. Date: Nov. 19, 2020

(65) Prior Publication Data
US 2022/0146138 A1 May 12, 2022

(30) Foreign Application Priority Data
May 10, 2019 (JP) ............... JP2019-089419

(51) Int. Cl.
*F24F 11/79* (2018.01)
*F24F 11/36* (2018.01)
(Continued)

(52) U.S. Cl.
CPC .............. *F24F 11/79* (2018.01); *F24F 7/007* (2013.01); *F24F 7/08* (2013.01); *F24F 11/36* (2018.01)

(58) Field of Classification Search
CPC .. F24F 11/36; F24F 11/79; F24F 7/007; F24F 7/08; F25B 2500/22; F25B 2500/222
See application file for complete search history.

(56) References Cited

U.S. PATENT DOCUMENTS 11,041,647 B2 * 6/2021 Weinert ................... F24F 11/79
2012/0052791 A1 * 3/2012 Kurelowech ............ F24F 11/77
454/329
(Continued)

FOREIGN PATENT DOCUMENTS

| CN | 105765311 A | 7/2016 |
| CN | 107250683 A | 10/2017 |

(Continued)

OTHER PUBLICATIONS

International Preliminary Report on Patentability issued in corresponding International Application No. PCT/JP2020/017720, dated Nov. 16, 2021 (4 pages).
(Continued)

*Primary Examiner* — Marc E Norman
(74) *Attorney, Agent, or Firm* — Osha Bergman Watanabe & Burton LLP (57) ABSTRACT

An air conditioning system includes: an air conditioner that generates conditioned air by heat exchange with a refrigerant and supplies the conditioned air to an air conditioning target space; a refrigerant sensor that detects refrigerant leakage; a ventilator that ventilates the air conditioning target space; and a controller. The ventilator includes: a total heat exchanger; a first air supply path and a first air exhaust path that connect the air conditioning target space and an outside of the air conditioning target space via the total heat exchanger; a second air supply path that connect the air conditioning target space and the outside of the air conditioning target space without passing through the total heat exchanger; an air supply fan that supplies air from the
(Continued)

outside of the air conditioning target space into the air conditioning target space via the first air supply path and the second air supply path.

3 Claims, 9 Drawing Sheets

(51) Int. Cl.
    *F24F 7/08*            (2006.01)
    *F24F 7/00*            (2021.01)
    *F24F 7/007*          (2006.01)

(56) References Cited

U.S. PATENT DOCUMENTS

| | | |
|---|---|---|
| 2016/0290675 A1 | 10/2016 | Hashino et al. |
| 2017/0159963 A1 | 6/2017 | Matsugi et al. |
| 2018/0045424 A1 | 2/2018 | Yajima et al. |
| 2018/0073762 A1 | 3/2018 | Yajima et al. |
| 2020/0263895 A1* | 8/2020 | Motodani ................ F24F 11/88 |
| 2020/0378645 A1* | 12/2020 | Doi ............................ F24F 7/08 |
| 2021/0341168 A1* | 11/2021 | Okeya .................. F24F 11/0001 |
| 2022/0018571 A1* | 1/2022 | Yamaguchi .............. F24F 11/77 |

FOREIGN PATENT DOCUMENTS

| | | |
|---|---|---|
| CN | 107429934 A | 12/2017 |
| JP | 2015-143593 A | 8/2015 |
| JP | 2016-196996 A | 11/2016 |
| JP | 2016-223643 A | 12/2016 |
| WO | 2016/132906 A1 | 8/2016 |
| WO | 2016/175073 A1 | 11/2016 |

OTHER PUBLICATIONS

International Search Report issued in corresponding International Application No. PCT/JP2020/017720 dated Jul. 21, 2020 (2 pages).

* cited by examiner

AIR CONDITIONING SYSTEM

TECHNICAL FIELD

The present disclosure relates to an air conditioning system.

BACKGROUND

Patent Literature 1 describes an air conditioning system including an air conditioner configured to perform air conditioning in a room that is an air conditioning target space by a vapor compression refrigeration cycle, and a ventilator configured to ventilate the air conditioning target space. This ventilator includes a housing having an air supply path and an air exhaust path, and a total heat exchanger, an air supply fan, and an air exhaust fan that are provided inside the housing. The total heat exchanger exchanges total heat between air flowing through the air supply path by the air supply fan, and air flowing through the air exhaust path by the air exhaust fan.

Patent Literature 1: Japanese Unexamined Patent Publication No. 2015-143593

In the air conditioning system as described above, when a refrigerant leaks from the air conditioner, it is desirable to discharge the refrigerant to an outside of the room in a short time. However, the air conditioning system described in Patent Literature 1 does not particularly consider the refrigerant leakage.

SUMMARY

One or more embodiments of the present disclosure provide an air conditioning system capable of discharging a refrigerant to an outside of an air conditioning target space in a short time when refrigerant leakage from an air conditioner occurs.

An air conditioning system according to one or more embodiments of the present disclosure includes:

an air conditioner configured to generate conditioned air by heat exchange with a refrigerant and supply the conditioned air to an air conditioning target space;

a refrigerant sensor configured to detect refrigerant leakage;

a ventilator configured to ventilate the air conditioning target space; and a controller configured to control the ventilator, wherein the ventilator includes:

a total heat exchanger;

a first air supply path and a first air exhaust path configured to allow an inside and an outside of the air conditioning target space to communicate with each other via the total heat exchanger;

a second air supply path configured to allow the inside and the outside of the air conditioning target space to communicate with each other without passing through the total heat exchanger;

an air supply fan configured to supply air outside the air conditioning target space into the air conditioning target space via the first air supply path and the second air supply path;

an air exhaust fan configured to discharge air in the air conditioning target space to the outside of the air conditioning target space via the first air exhaust path; and an air supply opening-closing mechanism configured to open and close by switching between the first air supply path and the second air supply path, and the controller controls the air supply opening-closing mechanism to open the second air supply path when the refrigerant sensor detects refrigerant leakage.

According to the above configuration, the refrigerant leaking from the air conditioner flows through the first air exhaust path together with the air in the air conditioning target space, and is discharged to the outside of the air conditioning target space via the total heat exchanger. However, since the air outside the air conditioning target space flows through the second air supply path, and is supplied into the air conditioning target space without passing through the total heat exchanger, the refrigerant does not return to a side of the air conditioning target space together with the supply air in the total heat exchanger, and can be discharged to the outside of the air conditioning target space in a short time.

In one or more embodiments, the ventilator includes:

a second air exhaust path configured to allow the inside and the outside of the air conditioning target space to communicate with each other without passing through the total heat exchanger and cause the air exhaust fan to discharge the air in the air conditioning target space to the outside of the air conditioning target space; and an air exhaust opening-closing mechanism configured to open and close by switching the first air exhaust path and the second air exhaust path, and the controller controls the air exhaust opening-closing mechanism to open the second air exhaust path when the refrigerant sensor detects refrigerant leakage.

With such a configuration, since both the exhaust air from the inside of the air conditioning target space to the outside of the air conditioning target space and the supply air from the outside of the air conditioning target space to the inside of the air conditioning target space do not pass through the total heat exchanger, the refrigerant discharged from the inside of the air conditioning target space does not return to the inside of the air conditioning target space again, and the refrigerant can be discharged to the outside of the air conditioning target space in a short time.

An air conditioning system according to one or more embodiments of the present disclosure includes:

an air conditioner configured to generate conditioned air by heat exchange with a refrigerant and supply the conditioned air to an air conditioning target space;

a refrigerant sensor configured to detect refrigerant leakage;

a ventilator configured to ventilate the air conditioning target space; and a controller configured to control the ventilator, wherein the ventilator includes:

a total heat exchanger;

a first air supply path and a first air exhaust path configured to allow an inside and an outside of the air conditioning target space to communicate with each other via the total heat exchanger;

a second air exhaust path configured to allow the inside and the outside of the air conditioning target space to communicate with each other without passing through the total heat exchanger;

an air supply fan configured to supply air outside the air conditioning target space into the air conditioning target space via the first air supply path;

an air exhaust fan configured to discharge air in the air conditioning target space to the outside of the air conditioning target space via the first air exhaust path and the second air exhaust path; and an air exhaust opening-closing mechanism configured to open and close by switching between the first air exhaust path and the second air exhaust path, and the controller controls the air exhaust opening-closing mechanism to open the second air exhaust path when the refrigerant sensor detects refrigerant leakage.

According to the above configuration, since the refrigerant leaking from the air conditioner flows through the second air exhaust path together with the air in the air conditioning target space and is discharged to the outside of the air conditioning target space without passing through the total heat exchanger, the refrigerant does not return to the side of the air conditioning target space together with the supply air in the total heat exchanger, and can be discharged to the outside of the air conditioning target space in a short time.

DETAILED DESCRIPTION

Hereinafter, embodiments of the present disclosure will be described in detail with reference to the accompanying drawings.

Figure 1:
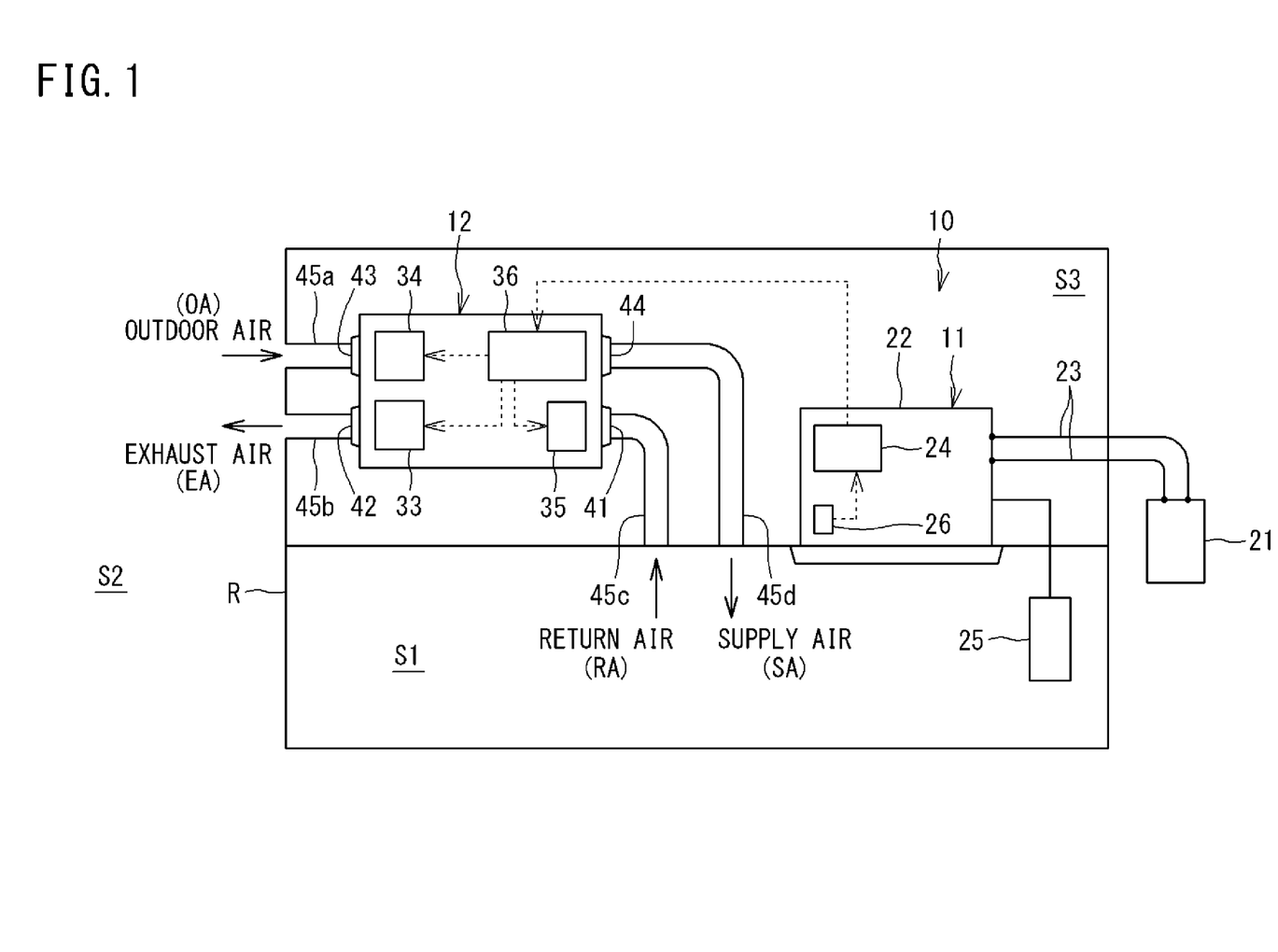
FIG. 1 is a schematic configuration diagram of an air conditioning system according to one or more embodiments.

FIG. 1 is a schematic configuration diagram of an air conditioning system according to one or more embodiments.

An air conditioning system 10 includes an air conditioner 11 and a ventilator 12. The air conditioner 11 includes an outdoor unit 21 and an indoor unit 22. The indoor unit 22 and the ventilator 12 are installed in a space S3 under a ceiling of a room R. However, the indoor unit 22 and the ventilator 12 may be installed on a wall, above a floor, below the ceiling, or the like of the room R. The indoor unit 22 and the ventilator 12 may be installed not only in the same place as the room R but also in different places.

(Configuration of Air Conditioner)

The air conditioner 11 performs a vapor compression refrigeration cycle by a refrigerant circuit including a compressor, a heat exchanger, an expansion valve, and the like to adjust a temperature of air in an indoor space (air conditioning target space) S1, which is an inside of the room R. The outdoor unit 21 and the indoor unit 22 are connected by refrigerant pipes 23 configuring the refrigerant circuit.

The indoor unit 22 takes in the air in the indoor space S1, performs heat exchange between the air and a refrigerant, and blows out the conditioned air, which is subjected to temperature adjustment, to the indoor space S1 again, thereby adjusting a temperature of the indoor space S1 as desired.

The indoor unit 22 includes a controller 24, a remote controller 25, and a refrigerant sensor 26.

The controller 24 (hereinafter, also referred to as an "air conditioning controller") controls operations of a fan, an electric valve, and the like contained in the indoor unit 22. The air conditioning controller 24 is configured of, for example, a microcomputer including a processor such as a CPU and a memory such as a RAM and a ROM. The air conditioning controller 24 exerts a predetermined function by the processor executing a program installed in the memory. The air conditioning controller 24 is also communicably connected to a controller 36 of the ventilator 12 described later. The air conditioning controller 24 may be provided in the outdoor unit 21, or the air conditioning controllers 24 may be provided in both the outdoor unit 21 and the indoor unit 22.

The remote controller 25 is used to manipulate operation start/operation stop and to perform operation setting of the temperature, a strength of blown air, and the like. The remote controller 25 is connected to the air conditioning controller 24 of the indoor unit 22 so as to be able to communicate therewith in a wired or wireless manner. A user uses the remote controller 25 to remotely manipulate the air conditioner 11.

The refrigerant sensor 26 detects refrigerant leaking from the refrigerant pipes or the like of the refrigerant circuit. A detection signal of the refrigerant sensor 26 is input to the air conditioning controller 24. The refrigerant sensor 26 is provided in a housing of the indoor unit 22. However, the refrigerant sensor 26 may be provided outside the housing of the indoor unit 22. The refrigerant sensor 26 may be provided, for example, in the remote controller 25 connected to the indoor unit 22.

(Configuration of Ventilator 12)

The ventilator 12 ventilates the indoor space S1. The ventilator 12 is operated in conjunction with the air conditioner 11 (see FIG. 1) or alone. The ventilator 12 is connected to an outdoor space S2 and the indoor space S1 via ducts 45a to 45d.

Figure 2:
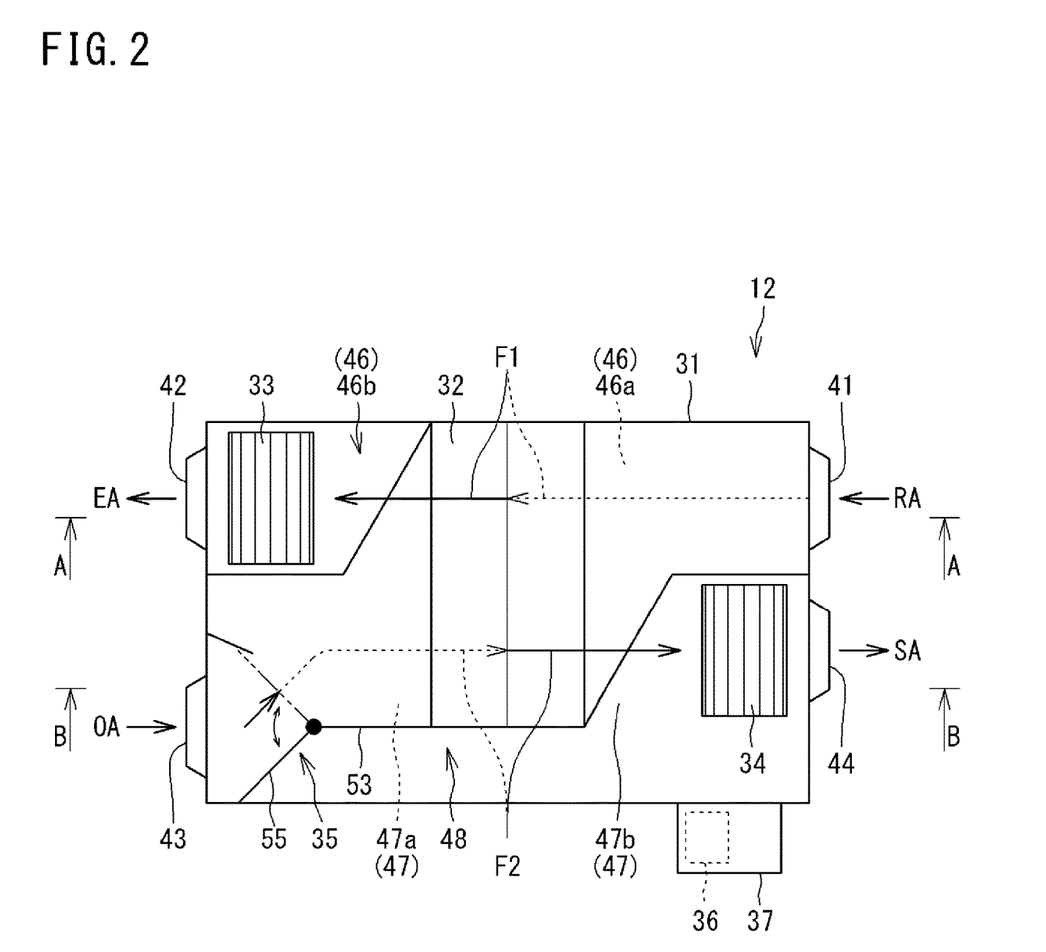
FIG. 2 is a schematic cross-sectional explanatory view of a ventilator performing first ventilation operation as viewed from above.
Figure 3:
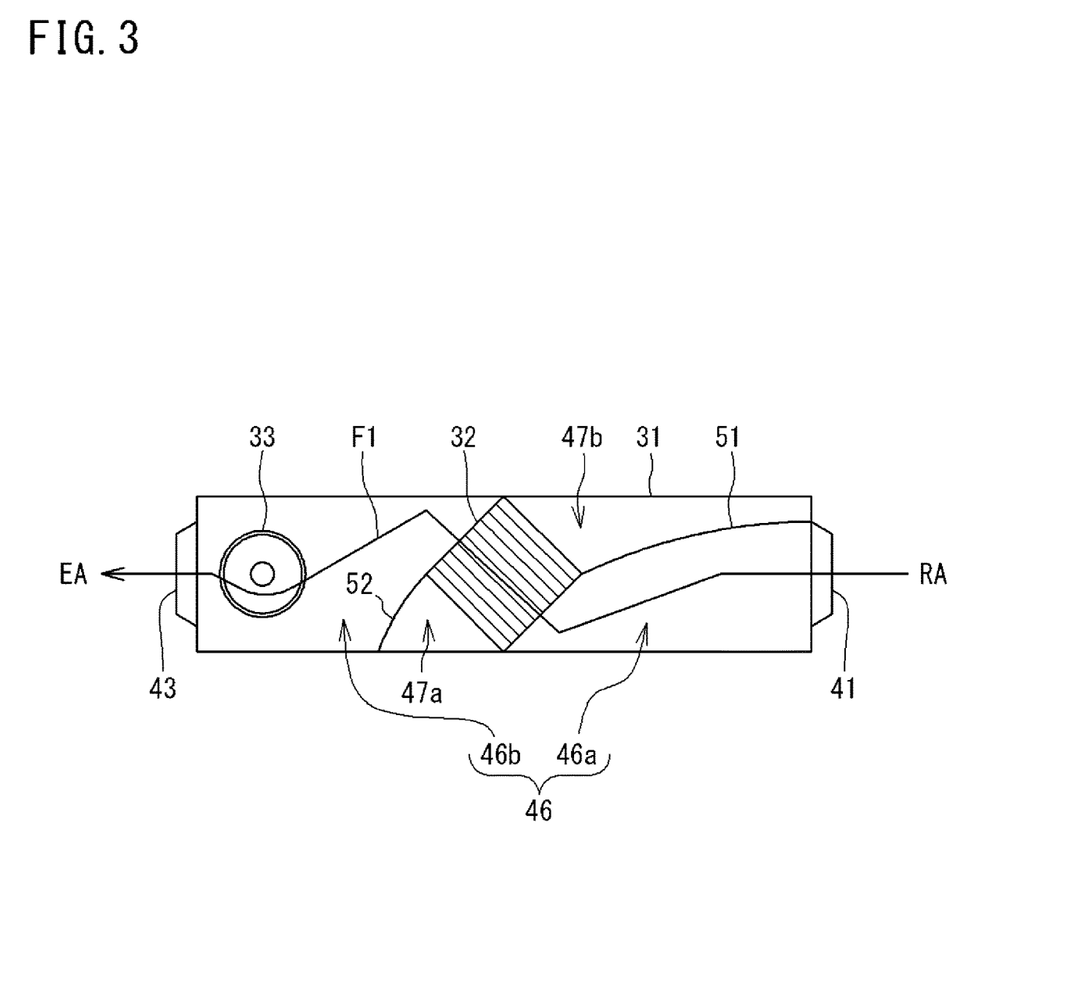
FIG. 3 is a schematic cross-sectional explanatory view taken along line A-A in FIG. 2.
Figure 4:
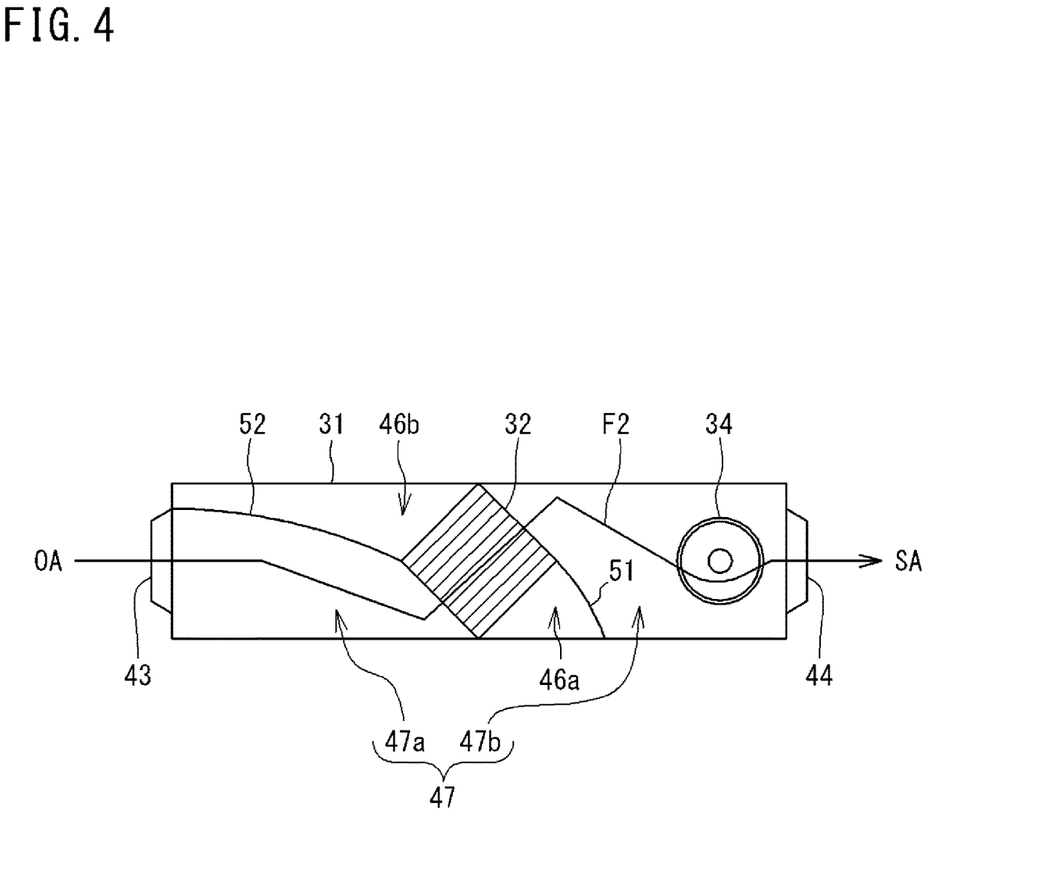
FIG. 4 is a schematic cross-sectional explanatory view taken along line B-B in FIG. 2.

FIG. 2 is a schematic cross-sectional explanatory view of the ventilator performing first ventilation operation as viewed from above. FIG. 3 is a schematic cross-sectional explanatory view taken along line A-A in FIG. 2. FIG. 4 is a schematic cross-sectional explanatory view taken along line B-B in FIG. 2. In the present specification, the "first ventilation operation" refers to normal ventilation operation for the indoor space S1 without refrigerant leakage as described later, and "second ventilation operation" refers to ventilation operation corresponding to refrigerant leakage.

The ventilator 12 includes a casing 31 having a substantially rectangular parallelepiped box shape. The casing 31 contains a total heat exchanger 32, an air exhaust fan 33, an air supply fan 34, an opening-closing mechanism 35, and the controller 36. The casing 31 is provided with a return air intake port 41, an exhaust air blow-out port 42, an outdoor air intake port 43, and a supply air blow-out port 44.

The return air intake port 41 is used to take in air (return air) RA from the indoor space S1 into the casing 31. The exhaust air blow-out port 42 is used to discharge the return air RA to the outdoor space S2 as exhaust air EA, the return air RA having been taken into the casing 31. The outdoor air intake port 43 is used to take in air (outdoor air) OA from the outdoor space S2 into the casing 31. The supply air blow-out port 44 is used to supply the outdoor air OA into the indoor space S1 as supply air SA, the outdoor air OA having been taken into the casing 31.

As shown in FIG. 1, the outdoor air intake port 43 and the exhaust air blow-out port 42 communicate with the outdoor space S2 via the ducts 45*a*, 45*b*, respectively. The return air intake port 41 and the supply air blow-out port 44 communicate with the indoor space S1 via the ducts 45*c*, 45*d*, respectively.

As shown in FIG. 2, inside the casing 31, the return air RA taken in through the return air intake port 41 passes through the total heat exchanger 32 and is discharged, as the exhaust air EA, to the outdoor space S2 through the exhaust air blow-out port 42. Hereinafter, this air flow will also be referred to as a "first air flow F1".

The outdoor air OA taken in through the outdoor air intake port 43 passes through the total heat exchanger 32 and is supplied, as the supply air SA, to the indoor space S1 through the supply air blow-out port 44. Hereinafter, the above-described air flow will also be referred to as a "second air flow F2".

Figure 5:
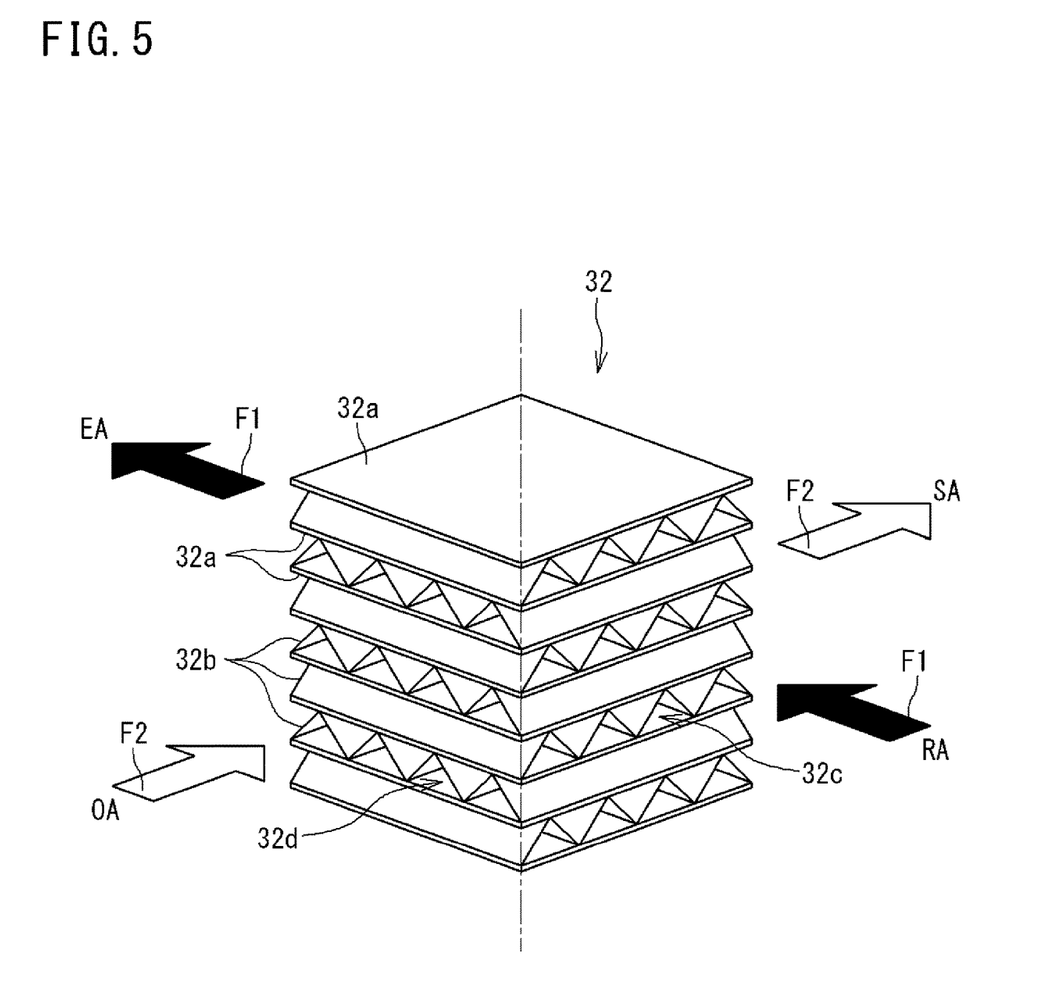
FIG. 5 is a perspective view of a total heat exchanger.

FIG. 5 is a perspective view of the total heat exchanger.

The total heat exchanger 32 in one or more embodiments is of a perpendicular type configured such that the first air flow F1 and the second air flow F2 are substantially perpendicularly to each other. This total heat exchanger 32 includes partition plates 32*a* and partition wall plates 32*b*. The partition plates 32*a* and the partition wall plates 32*b* are alternately laminated with an appropriate adhesive. The total heat exchanger 32 is formed in a substantially quadrangular prism shape as a whole.

Each of the partition plates 32*a* has heat conductivity and moisture permeability, and is formed in a flat plate shape. The partition plate 32*a* also has a property of permeating the refrigerant.

Each of the partition wall plates 32*b* is formed in a wave plate shape in which a substantially triangular cross section is continuously formed. The partition wall plate 32*b* forms air passages between two adjacent partition plates 32*a*. The partition wall plates 32*b* are stacked one by one at an angle changed by 90 degrees in a stacking direction (vertical direction in FIG. 5) of the partition plates 32*a* and the partition wall plates 32*b*. Thus, exhaust-side passages 32*c* through which the first air flow F1 passes and supply-side passages 32*d* through which the second air flow F2 passes are formed orthogonal to each other on both sides of each of the partition plates 32*a*. The air flowing through the exhaust-side passages 32*c* and the air flowing through the supply-side passages 32*d* exchange sensible heat and latent heat (total heat exchange) via the partition plates 32*a* having heat conductivity and moisture permeability.

As shown in FIGS. 2 to 4, an inside of the casing 31 is sectioned by the total heat exchanger 32 into two regions, namely, a region on an indoor space S1 side and a region on an outdoor space S2 side. As shown in FIGS. 2 and 3, inside the casing 31, an upstream-side air exhaust path 46*a* is formed on an upstream side of the total heat exchanger 32 in the first air flow F1, and a downstream-side air exhaust path 46*b* is formed on a downstream side of the total heat exchanger 32 in the first air flow F1. The upstream-side air exhaust path 46*a* and the downstream-side air exhaust path 46*b* configure a first air exhaust path 46 communicating the indoor space S1 (see FIG. 1) and the outdoor space S2 (see FIG. 1) with each other via the total heat exchanger 32.

As shown in FIGS. 2 and 4, inside the casing 31, an upstream-side air supply path 47*a* is formed on the upstream side of the total heat exchanger 32 in the second air flow F2, and a downstream-side air supply path 47*b* is formed on the downstream side of the total heat exchanger 32 in the second air flow F2. The upstream-side air supply path 47*a* and the downstream-side air supply path 47*b* configure a first air supply path 47 communicating the indoor space S1 and the outdoor space S2 with each other via the total heat exchanger 32.

As shown in FIGS. 3 and 4, a sectioning wall 51 is provided between the upstream-side air exhaust path 46*a* and the downstream-side air supply path 47*b* interpose. A sectioning wall 52 is provided between the downstream-side air exhaust path 46*b* and the upstream-side air supply path 47*a*.

As shown in FIGS. 2 and 3, in the downstream-side air exhaust path 46*b*, the air exhaust fan 33 is disposed in the vicinity of the exhaust air blow-out port 42. The air exhaust fan 33 is driven to generate the first air flow F1, and the return air RA from the indoor space S1 passes through the first air exhaust path 46 to be discharged as the exhaust air EA to the outdoor space S2.

As shown in FIGS. 2 and 4, in the downstream-side air supply path 47*b*, the air supply fan 34 is disposed in the vicinity of the supply air blow-out port 44. The air supply fan 34 is driven to generate the second air flow F2, and the outdoor air OA in the outdoor space S2 passes through the first air supply path 47 to be supplied to the indoor space S1 as the supply air SA.

As shown in FIG. 2, inside the casing 31 of one or more embodiments, a second air supply path 48 and the opening-closing mechanism 35 are provided.

The second air supply path 48 is formed between the outdoor air intake port 43 and the supply air blow-out port 44 and allows both to communicate with each other. The second air supply path 48 is sectioned from the upstream-side air supply path 47*a* and the total heat exchanger 32 by a partition wall 53. The second air supply path 48 allows the indoor space S1 and the outdoor space S2 to communicate with each other without passing through the total heat exchanger 32. A downstream side of the second air supply path 48 joins the downstream-side air supply path 47*b*.

The opening-closing mechanism 35 has an air supply damper (air supply opening-closing mechanism) 51 configured to open and close by switching between the first air supply path 47 and the second air supply path 48. The air supply damper 55 is, for example, swingably attached to the partition wall 53. The air supply damper 55 is driven by a motor (not shown). The air supply damper 55 switches between a first mode in which the first air supply path 47 is opened to communicate with the outdoor air intake port 43 and the second air supply path 48 is closed with respect to the outdoor air intake port 43, and a second mode in which the second air supply path 48 is opened to communicate with the outdoor air intake port 43 and the first air supply path 47 is closed with respect to the outdoor air intake port 43.

Figure 6:
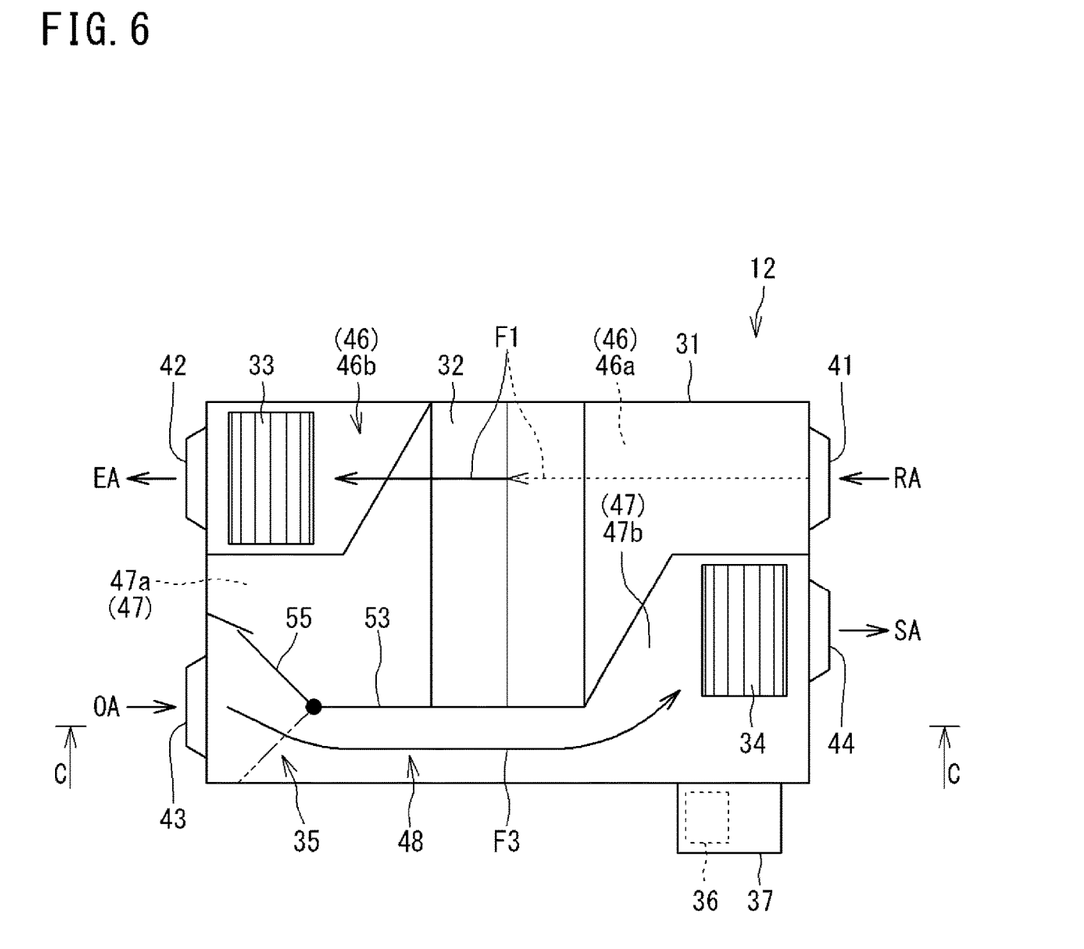
FIG. 6 is a schematic cross-sectional explanatory view of the ventilator performing second ventilation operation as viewed from above.
Figure 7:
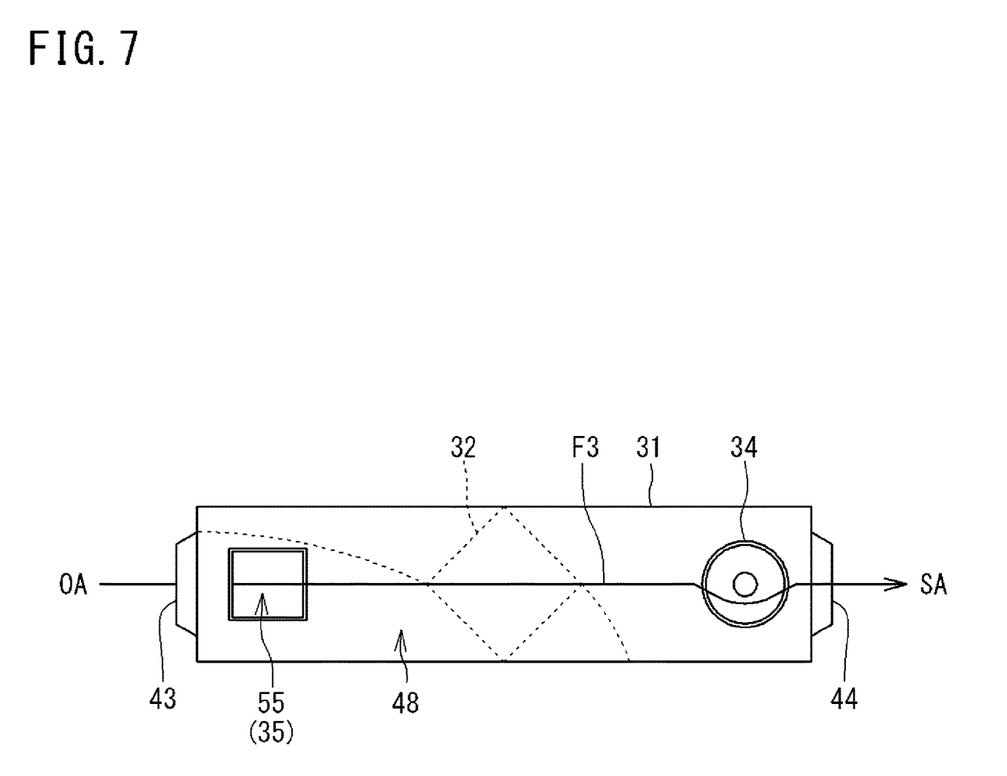
FIG. 7 is a schematic cross-sectional explanatory view taken along line C-C in FIG. 6.

FIG. 6 is a schematic cross-sectional explanatory view of the ventilator performing the second ventilation operation as viewed from above. FIG. 7 is a schematic cross-sectional explanatory view taken along line C-C in FIG. 6.

When the air supply damper 55 is switched to the first mode, as shown in FIG. 2, the second air flow F2 passing through the first air supply path 47 from the outdoor air intake port 43 and the first air flow F1 passing through the first air exhaust path 46 from the return air intake port 41 both pass through the total heat exchanger 32, and sensible heat and latent heat are exchanged between the two air flows. On the other hand, when the air supply damper 55 is switched to the second mode, as shown in FIGS. 6 and 7, heat exchange is not performed between an air flow (third air flow) F3 passing through the second air supply path 48 from the outdoor air intake port 43 and the first air flow F1 passing through the first air exhaust path 46 from the return air intake port 41.

As shown in FIG. 1, the controller 36 of the ventilator 12 (hereinafter, also referred to as a ventilation controller) controls operations of the air exhaust fan 33, the air supply fan 34, and the opening-closing mechanism 35 (the air supply damper 55). As shown in FIG. 2, the ventilation controller 36 is contained in a control box 37 included in the casing 31. The ventilation controller 36 is configured of a microcomputer including a processor such as a CPU, and a memory such as a RAM and a ROM, and the like. The ventilation controller 36 exerts a predetermined function by the processor executing a program installed in the memory. The ventilation controller 36 is communicably connected to the air conditioning controller 24 of the air conditioner 11.

The ventilation controller 36 controls the operations of the air exhaust fan 33, the air supply fan 34, and the opening-closing mechanism 35 to switch between the first ventilation operation performed for normal ventilation of the indoor space S1 and the second ventilation operation corresponding to refrigerant leakage.

As shown in FIGS. 2 to 4, the first ventilation operation is performed by driving the air exhaust fan 33 and the air supply fan 34 and switching the air supply damper 55 of the opening-closing mechanism 35 to the first mode. As a result, the return air RA from the indoor space S1 is discharged to the outdoor space S2, and the outdoor air OA from the outdoor space S2 is supplied to the indoor space S1, so that the indoor space S1 is ventilated. Furthermore, sensible heat and latent heat are exchanged between the return air RA from the indoor space S1 and the outdoor air OA from the outdoor space S2, and changes in temperature and humidity in the indoor space S1 can be suppressed.

The second ventilation operation corresponding to the refrigerant leakage is performed when the refrigerant in the air conditioner 11 leaks. When the refrigerant sensor 26 provided in the indoor unit 22 detects refrigerant leakage, a detection signal thereof is input to the air conditioning controller 24. The air conditioning controller 24 transmits, to the ventilation controller 36, information (refrigerant leakage information) indicating that refrigerant leakage occurs, and the ventilation controller 36 controls the operations of the air exhaust fan 33, the air supply fan 34, and the opening-closing mechanism 35 on the basis of the refrigerant leakage information.

Specifically, when refrigerant leakage occurs, the ventilation controller 36 drives the air exhaust fan 33 and the air supply fan 34 to switch the air supply damper 55 to the second mode. When the air exhaust fan 33 and the air supply fan 34 are already driven, the driving is continued as it is. As a result, as shown in FIGS. 6 and 7, the return air RA from the indoor space S1 passes through the first air exhaust path 46 and is discharged to the outdoor space S2 via the total heat exchanger 32. The outdoor air OA from the outdoor space S2 passes through the second air supply path 48 and is supplied to the indoor space S1 without passing through the total heat exchanger 32.

When the refrigerant leaks from the indoor unit 22, the ventilator 12 takes in air containing the refrigerant from the return air intake port 41 into the casing 31 and discharges the air from the exhaust air blow-out port 42 through the total heat exchanger 32. Since each of the partition plates 32a of the total heat exchanger 32 has the property of permeating the refrigerant, if the outdoor air OA taken in from the outdoor air intake port 43 passes through the total heat exchanger 32 and is supplied as the supply air SA to the indoor space S1 as in the first ventilation operation, the refrigerant permeated through the partition plate 32a in the total heat exchanger 32 returns to the indoor space S1 together with the supply air SA, and it becomes difficult to reduce a concentration of the refrigerant in the indoor space S1. In one or more embodiments, by performing the second ventilation operation, the outdoor air OA from the outdoor space S2 can be supplied to the indoor space S1 without passing through the total heat exchanger 32 by using the second air supply path 48 instead of the first air supply path 47, the return of the refrigerant to the indoor space S1 can be suppressed, and the concentration of the refrigerant in the indoor space S1 can be reduced in a short time.

The air conditioner 11 stops refrigeration cycle operation when the refrigerant sensor 26 detects refrigerant leakage. At this time, the air conditioner 11 may stop or drive a fan of the indoor unit 22. By driving the fan of the indoor unit 22, diffusion of the refrigerant in the indoor space S1 can be promoted.

Figure 8:
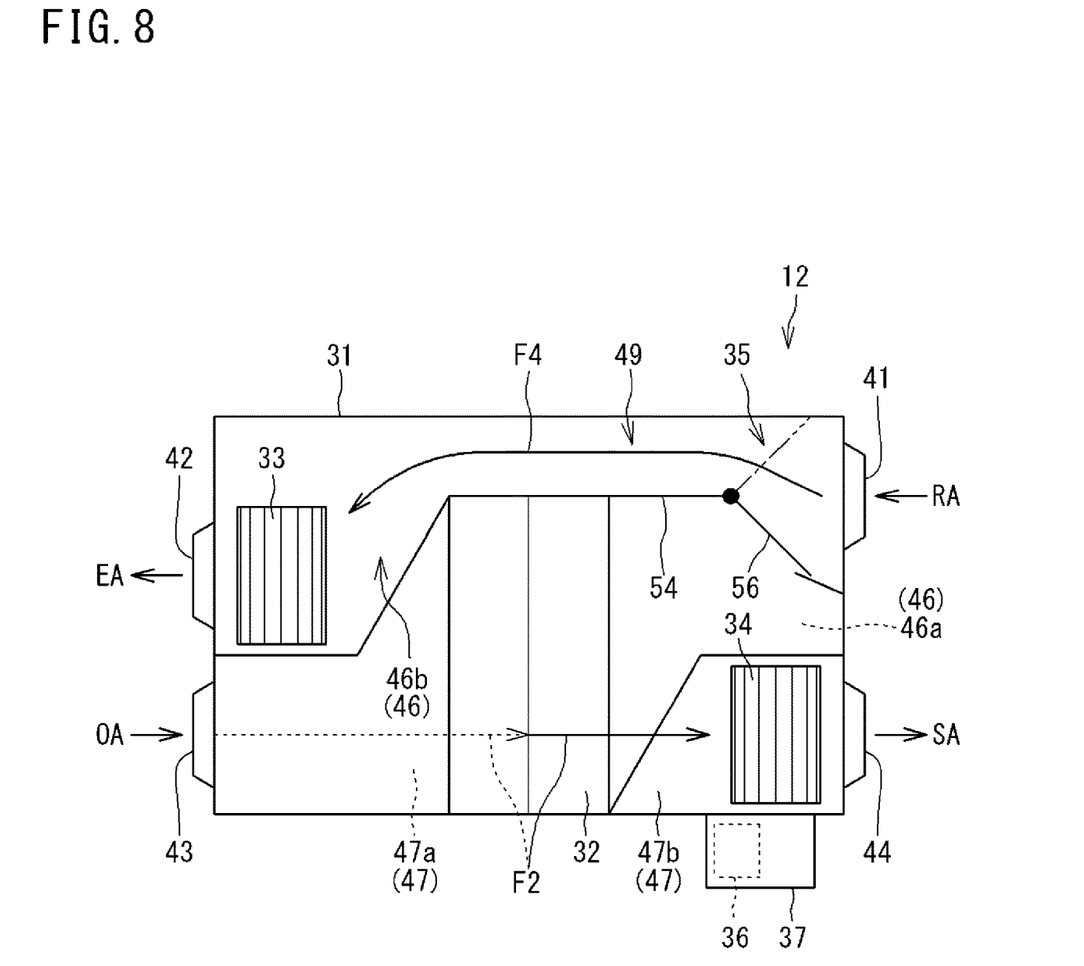
FIG. 8 is a schematic cross-sectional explanatory view of a ventilator performing second ventilation operation of an air conditioning system according to one or more embodiments as viewed from above.

FIG. 8 is a schematic cross-sectional explanatory view of a ventilator performing second ventilation operation of an air conditioning system according to one or more embodiments as viewed from above.

The ventilator 12 of one or more embodiments includes a second air exhaust path 49 instead of the second air supply path 48 in the above-described embodiments. The second air exhaust path 49 is formed between the return air intake port 41 and the exhaust air blow-out port 42 and allows both to communicate with each other. The second air exhaust path 49 is sectioned from the upstream-side air exhaust path 46a and the total heat exchanger 32 by a partition wall 54. A downstream side of the second air exhaust path 49 joins the downstream-side air exhaust path 46b. As described above, the second air exhaust path 49 allows the indoor space S1 and the outdoor space S2 to communicate with each other without passing through the total heat exchanger 32.

The opening-closing mechanism 35 includes an air exhaust damper (air exhaust opening-closing mechanism) 56 configured to open and close by switching between the first air exhaust path 46 and the second air exhaust path 49. The air exhaust damper 56 is, for example, swingably attached to the partition wall 54. The air exhaust damper 56 switches between a first mode in which the first air exhaust path 46 is opened to communicate with the return air intake port 41 and the second air exhaust path 49 is closed with respect to the return air intake port 41, and a second mode in which the second air exhaust path 49 is opened to communicate with the return air intake port 41 and the first air exhaust path 46 is closed with respect to the return air intake port 41.

When the normal first ventilation operation is performed, the ventilator 12 of one or more embodiments switches the air exhaust damper 56 to the first mode, and performs ventilation while exchanging sensible heat and latent heat in the total heat exchanger 32 in the mode shown in FIGS. 2 to 4.

When refrigerant leakage is detected, the ventilator 12 performs the second ventilation operation by switching the air exhaust damper 56 to the second mode as shown in FIG. 8. In this case, the outdoor air OA taken into the casing 31 from the outdoor air intake port 43 passes through the total heat exchanger 32 and is supplied into the room from the supply air blow-out port 44 as the supply air SA. The return air RA from the indoor space S1, which has been taken into the casing 31 through the return air intake port 41, passes through the second air exhaust path 49 and is discharged from the exhaust air blow-out port 42 to the outdoor space S2 without passing through the total heat exchanger 32. Therefore, total heat exchange is not performed between the second air flow F2 passing through the first air supply path 47 from the outdoor air intake port 43 and an air flow (fourth air flow) F4 passing through the second air exhaust path 49 from the return air intake port 41, and the leaking refrigerant does not return to the indoor space S1. Therefore, a refrigerant concentration in the indoor space S1 can be reduced in a short time by the ventilation.

Figure 9:
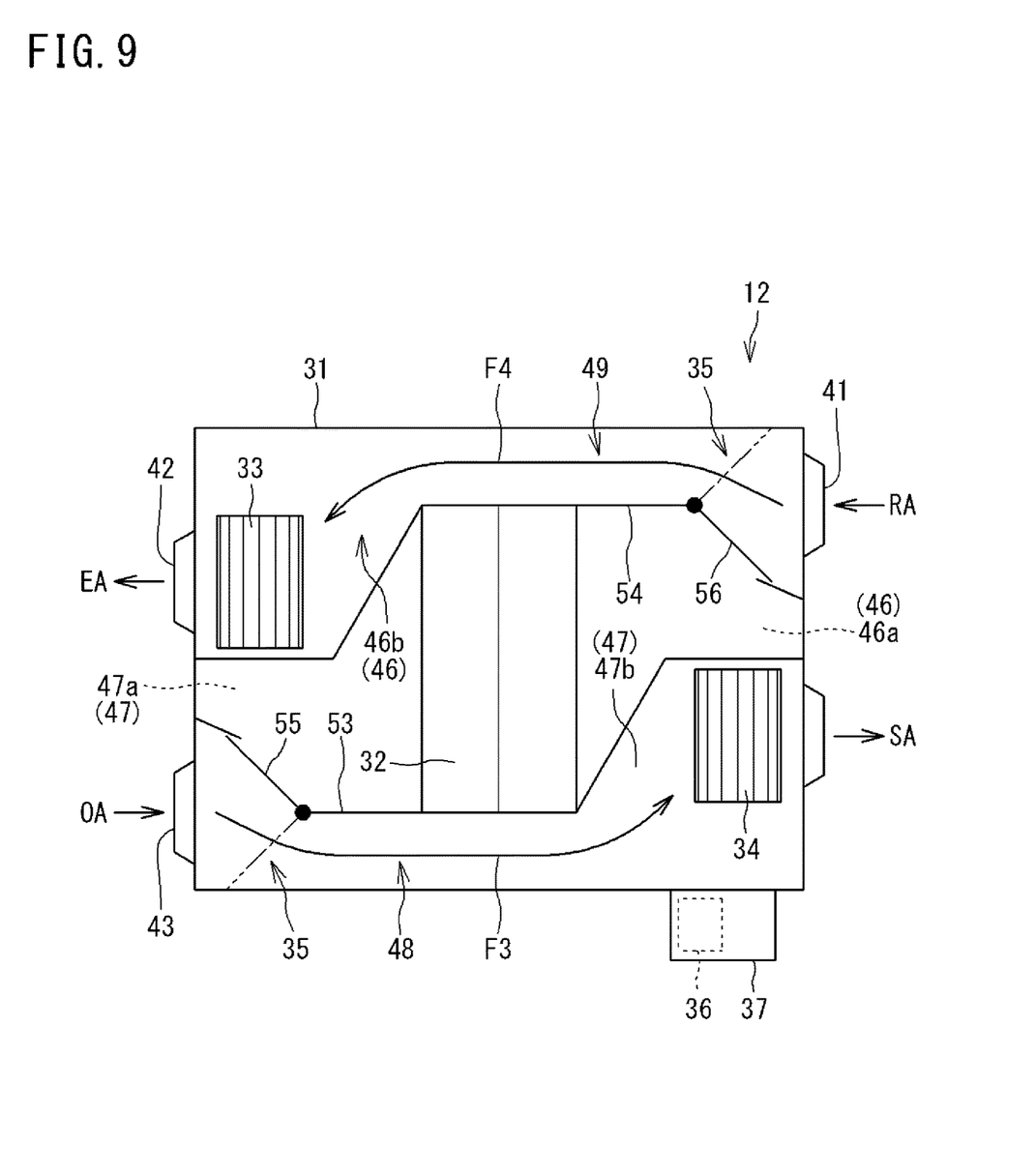
FIG. 9 is a schematic cross-sectional explanatory view of a ventilator performing second ventilation operation of an air conditioning system according to one or more embodiments as viewed from above.

FIG. 9 is a schematic cross-sectional explanatory view of a ventilator performing second ventilation operation of an air conditioning system according to one or more embodiments as viewed from above.

The ventilator 12 of one or more embodiments includes both the second air supply path 48 described in the above-described embodiments and the second air exhaust path 49 described in the above-described embodiments. The ventilator 12 includes, as the opening-closing mechanism 35, the air supply damper 55 corresponding to the second air supply path 48 and the air exhaust damper 56 corresponding to the second air exhaust path 49.

When the normal first ventilation operation is performed, the ventilator 12 of one or more embodiments switches each of the dampers 55, 56 to the first mode, and performs ventilation while exchanging sensible heat and latent heat in the total heat exchanger 32 in the mode shown in FIGS. 2 to 4.

When the refrigerant sensor 26 detects refrigerant leakage, the ventilator 12 performs the second ventilation operation by switching each of the dampers 55, 56 to the second mode as shown in FIG. 9. In this case, the outdoor air OA taken into the casing 31 from the outdoor air intake port 43 is supplied to the indoor space S1 through the second air supply path 48, and the return air RA taken into the casing 31 from the return air intake port 41 is discharged to the outdoor space S2 through the second air exhaust path 49.

Therefore, neither the third air flow F3 passing through the second air supply path 48 from the outdoor air intake port 43 nor the fourth air flow F4 passing through the second air exhaust path 49 from the return air intake port 41 passes through the total heat exchanger 32, and total heat exchange is not performed between both. Therefore, the leaking refrigerant does not return to the indoor space S1, and the refrigerant concentration in the indoor space S1 can be reduced in a short time by ventilation.

Operation and Effects

The air conditioning system 10 in one or more embodiments includes the air conditioner 11 configured to generate conditioned air by heat exchange with the refrigerant and supply the conditioned air to the indoor space (into the air conditioning target space) S1, the refrigerant sensor 26 configured to detect refrigerant leakage, the ventilator 12 configured to ventilate the indoor space S1, and the controller 36 configured to control the ventilator 12. The ventilator 12 includes the total heat exchanger 32, the first air supply path 47 and the first air exhaust path 46 configured to allow the indoor space S1 and the outdoor space (outside the air conditioning target space) S2 to communicate with each other via the total heat exchanger 32, the second air supply path 48 configured to allow the indoor space S1 and the outdoor space S2 to communicate with each other without passing through the total heat exchanger 32, the air supply fan 34 configured to supply the air in the outdoor space S2 to the indoor space S1 via the first air supply path 47 and the second air supply path 48, the air exhaust fan 33 configured to discharge the air in the indoor space S1 to the outdoor space S2 via the first air exhaust path 46, and the air supply damper 55 configured to open and close by switching between the first air supply path 47 and the second air supply path 48. When the refrigerant sensor 26 detects refrigerant leakage, the ventilation controller 36 controls the air supply damper 55 to open the second air supply path 48.

With the above configuration, the refrigerant leaking from the air conditioner 11 flows through the first air exhaust path 46 together with the return air RA from the indoor space S1, and is discharged to the outdoor space S2 via the total heat exchanger 32, but the outdoor air OA from the outdoor space S2 flows through the second air supply path 48 and does not pass through the total heat exchanger 32. Therefore, the refrigerant does not return to the side of the indoor space S1 together with the supply air SA in the total heat exchanger 32, and the refrigerant is discharged to the outdoor space S2 in a short time, so that the refrigerant concentration in the indoor space S1 can be reduced.

In the air conditioning system 10 in one or more embodiments, in addition to the air conditioning system according to the above-described embodiments, the ventilator 12 includes the second air exhaust path 49 configured to allow the indoor space S1 and the outdoor space S2 to communicate with each other without passing through the total heat exchanger 32 and cause the air exhaust fan 33 to discharge the air in the indoor space S1 to the outdoor space S2, and the air exhaust damper 56 configured to open and close by switching the first air exhaust path 46 and the second air exhaust path 49. When the refrigerant sensor 26 detects refrigerant leakage, the ventilation controller 36 controls the air exhaust damper 56 to open the second air exhaust path 49.

With the above-described configurations, since both the exhaust air from the indoor space S1 to the outdoor space S2 and the supply air from the outdoor space S2 to the indoor space S1 do not pass through the total heat exchanger 32, the refrigerant discharged from the indoor space S1 does not return to the indoor space S1 again, and the refrigerant can be discharged to the outdoor space S2 in a short time.

In the air conditioning system 10 of one or more embodiments, the refrigerant leaking from the air conditioner 11 passes through the second air exhaust path 49 together with the return air RA from the indoor space S1, and is discharged to the outdoor space S2 without passing through the total heat exchanger 32, so that the refrigerant does not adhere to, and remain in the total heat exchanger 32. Therefore, after the end of the second ventilation operation, the operation can be returned to the normal first ventilation operation without taking a measure for removing the refrigerant from the total heat exchanger 32 (replacement, maintenance, or the like of the total heat exchanger 32).

The air conditioning system 10 in one or more embodiments includes the air conditioner 11 configured to generate the conditioned air by heat exchange with the refrigerant and supply the conditioned air to the indoor space S1, the refrigerant sensor 26 configured to detect refrigerant leakage, the ventilator 12 configured to ventilate the indoor space S1, and the ventilation controller 36 configured to control the ventilator 12. The ventilator 12 includes the total heat exchanger 32, the first air supply path 47 and the first air exhaust path 46 configured to allow the indoor space S1 and the outdoor space S2 to communicate with each other via the total heat exchanger 32, the second air exhaust path 49 configured to allow the indoor space S1 and the outdoor space S2 to communicate with each other without passing through the total heat exchanger 32, the air supply fan 34 configured to supply the air in the outdoor space S2 to the indoor space S1 via the first air supply path 47, the air exhaust fan 33 configured to discharge the air in the indoor space S1 to the outdoor space S2 via the first air exhaust path 46 and the second air exhaust path 49, and the air exhaust damper 56 configured to open and close by switching between the first air exhaust path 46 and the second air exhaust path 49. The controller 36 controls the air exhaust damper 56 to open the second air exhaust path 49 when the refrigerant sensor 26 detects refrigerant leakage.

With the above configuration, while the ventilator 12 supplies the air from the outdoor space S2 to the indoor space S1 via the total heat exchanger 32, the refrigerant leaking from the air conditioner 11 flows through the second air exhaust path 49 together with the air in the indoor space S1 and is discharged to the outdoor space S2 without passing through the total heat exchanger 32. Therefore, the refrigerant does not return to the side of the indoor space S1 together with the supply air in the total heat exchanger 32, and the refrigerant can be discharged to the outdoor space S2 in a short time to reduce the refrigerant concentration in the indoor space S1.

In the air conditioning system 10 of one or more embodiments, the refrigerant leaking from the air conditioner 11 passes through the second air exhaust path 49 together with the return air RA from the indoor space S1, and is discharged to the outdoor space S2 without passing through the total heat exchanger 32, so that the refrigerant does not adhere to, and remain in the total heat exchanger 32. Therefore, after the end of the second ventilation operation, the operation can be returned to the normal first ventilation operation without taking a measure for removing the refrigerant from the total heat exchanger 32 (replacement, maintenance, or the like of the total heat exchanger 32).

Although the disclosure has been described with respect to only a limited number of embodiments, those skilled in the art, having benefit of this disclosure, will appreciate that various other embodiments may be devised without departing from the scope of the present disclosure. Accordingly, the scope of the present disclosure should be limited only by the attached claims.

For example, the refrigerant sensor 26 may be provided in the ventilator 12, and when the refrigerant sensor 26 detects refrigerant leakage, the ventilator 12 may independently perform the second ventilation operation without an instruction from the air conditioner 11.

The operation of the ventilator 12 may be controlled by the controller 24 of the air conditioner 11.

REFERENCE SIGNS LIST

10: AIR CONDITIONING SYSTEM
11: AIR CONDITIONER
12: VENTILATOR
26: REFRIGERANT SENSOR
32: TOTAL HEAT EXCHANGER
33: AIR EXHAUST FAN
34: AIR SUPPLY FAN
36: VENTILATION CONTROLLER
46: FIRST AIR EXHAUST PATH
47: FIRST AIR SUPPLY PATH
48: SECOND AIR SUPPLY PATH
49: SECOND AIR EXHAUST PATH
55: AIR SUPPLY DAMPER (AIR SUPPLY OPENING-CLOSING MECHANISM)
56: AIR EXHAUST DAMPER (AIR EXHAUST OPENING-CLOSING MECHANISM)
S1: INDOOR SPACE
S2: OUTDOOR SPACE

The invention claimed is:

1. An air conditioning system comprising:
an air conditioner that generates conditioned air by heat exchange with a refrigerant and supplies the conditioned air to an air conditioning target space;
a refrigerant sensor that detects refrigerant leakage;
a ventilator that ventilates the air conditioning target space; and
a controller that controls the ventilator,
wherein the ventilator includes:
a total heat exchanger;
a first air supply path and a first air exhaust path that connect the air conditioning target space and an outside of the air conditioning target space via the total heat exchanger;
a second air supply path that connect the air conditioning target space and the outside of the air conditioning target space without passing through the total heat exchanger;
an air supply fan that supplies air from the outside of the air conditioning target space into the air conditioning target space via the first air supply path and the second air supply path;
an air exhaust fan that discharges air from the air conditioning target space to the outside of the air conditioning target space via the first air exhaust path; and
an air supply opening-closing mechanism that switches between the first air supply path and the second air supply path, and
the controller switches the air supply opening-closing mechanism to the second air supply path when the refrigerant sensor detects the refrigerant leakage.

2. The air conditioning system according to claim 1, wherein
the ventilator further includes:
a second air exhaust path that connects the air conditioning target space and the outside of the air conditioning target space without passing through the total heat exchanger and that causes the air exhaust fan to discharge the air from the air conditioning target space to the outside of the air conditioning target space; and
an air exhaust opening-closing mechanism that switches between the first air exhaust path and the second air exhaust path, and
the controller switches the air exhaust opening-closing mechanism to the second air exhaust path when the refrigerant sensor detects the refrigerant leakage.

3. An air conditioning system comprising:
an air conditioner that generates conditioned air by heat exchange with a refrigerant and supplies the conditioned air to an air conditioning target space;
a refrigerant sensor that detects refrigerant leakage;
a ventilator that ventilates the air conditioning target space; and
a controller that controls the ventilator,
wherein the ventilator includes:
a total heat exchanger;

a first air supply path and a first air exhaust path that connects the air conditioning target space and an outside of the air conditioning target space via the total heat exchanger;

a second air exhaust path that connects the air conditioning target space and the outside of the air conditioning target space without passing through the total heat exchanger;

an air supply fan that supplies air from the outside of the air conditioning target space into the air conditioning target space via the first air supply path;

an air exhaust fan that discharges air from the air conditioning target space to the outside of the air conditioning target space via the first air exhaust path and the second air exhaust path; and an air exhaust opening-closing mechanism that switches between the first air exhaust path and the second air exhaust path, and the controller switches the air exhaust opening-closing mechanism to the second air exhaust path when the refrigerant sensor detects the refrigerant leakage.

\* \* \* \* \*